US012106868B2

(12) United States Patent
Iwamoto et al.

(10) Patent No.: US 12,106,868 B2
(45) Date of Patent: Oct. 1, 2024

(54) INSULATED WIRE

(71) Applicants: SUMITOMO ELECTRIC INDUSTRIES, LTD., Osaka (JP); SUMITOMO ELECTRIC WINTEC, INC., Koka (JP)

(72) Inventors: Takahiro Iwamoto, Osaka (JP); Masaaki Yamauchi, Osaka (JP); Hirotsugu Mochida, Koka (JP)

(73) Assignees: SUMITOMO ELECTRIC INDUSTRIES, LTD., Osaka (JP); SUMITOMO ELECTRIC WINTEC, INC., Shiga (JP)

( * ) Notice: Subject to any disclaimer, the term of this patent is extended or adjusted under 35 U.S.C. 154(b) by 0 days.

(21) Appl. No.: 17/925,671

(22) PCT Filed: May 2, 2022

(86) PCT No.: PCT/JP2022/019515

§ 371 (c)(1),
(2) Date: Nov. 16, 2022

(87) PCT Pub. No.: WO2023/026591

PCT Pub. Date: Mar. 2, 2023

(65) Prior Publication Data

US 2024/0145116 A1 May 2, 2024

(30) Foreign Application Priority Data

Aug. 24, 2021 (JP) ................................ 2021-136332

(51) Int. Cl.
*H01B 3/00* (2006.01)
*H01B 3/30* (2006.01)
*H01B 17/62* (2006.01)

(52) U.S. Cl.
CPC ............ *H01B 3/303* (2013.01); *H01B 17/62* (2013.01)

(58) Field of Classification Search
CPC ........................................................ H01B 3/00
See application file for complete search history.

(56) References Cited

U.S. PATENT DOCUMENTS

2008/0044682 A1* 2/2008 Chan ................. C08G 73/1007 428/626

FOREIGN PATENT DOCUMENTS

| | | |
|---|---|---|
| CN | 109251657 A | 1/2019 |
| JP | 2004-269770 A | 9/2004 |
| JP | 2017-517582 A | 6/2017 |

* cited by examiner

*Primary Examiner* — Chau N Nguyen
(74) *Attorney, Agent, or Firm* — Oliff PLC

(57) ABSTRACT

An insulated wire including: a linear conductor; and an insulating layer that covers an outer peripheral surface of the conductor, wherein the insulating layer contains, as residual solvents, a first solvent having a relative permittivity of 15 or more and a second solvent having a relative permittivity of less than 15, a first ratio that is a ratio of a content of the second solvent to a total content of the first solvent and the second solvent contained in the insulating layer is 50% by mass or more, and a second ratio that is a ratio of the content of the second solvent to the total content of the first solvent and the second solvent contained in the insulating layer after a heating treatment of heating the insulated wire at 350° C. for 1 minute is higher than the first ratio.

4 Claims, No Drawings

INSULATED WIRE

TECHNICAL FIELD

The present disclosure relates to an insulated wire. This application claims priority based on Japanese Patent Application No. 2021-136332, filed on Aug. 24, 2021. All descriptions described in the Japanese patent application are incorporated herein by reference.

BACKGROUND ART

Conventionally, an insulated wire including a linear conductor and an insulating layer that covers the outer peripheral surface of the conductor is known. The insulated wire is suitably used as a coil of, for example, a motor, a transformer, or the like. Japanese Patent Laying-Open No. 2004-269770 (PTL 1) discloses a polyurethane-based paint for an insulated wire, with which an insulated wire excellent in insulation properties can be manufactured by extremely reducing the amount of a residual solvent in an insulating film.

CITATION LIST

Patent Literature

PTL 1: Japanese Patent Laying-Open No. 2004-269770

SUMMARY OF INVENTION

An insulated wire of the present disclosure is an insulated wire including a linear conductor and an insulating layer that covers an outer peripheral surface of the conductor, wherein the insulating layer contains, as residual solvents, a first solvent having a relative permittivity of 15 or more and a second solvent having a relative permittivity of less than 15, a first ratio that is a ratio of a content of the second solvent to a total content of the first solvent and the second solvent contained in the insulating layer is 50% by mass or more, and a second ratio that is a ratio of the content of the second solvent to the total content of the first solvent and the second solvent contained in the insulating layer after a heating treatment of heating the insulated wire at 350° C. for 1 minute is higher than the first ratio.

DETAILED DESCRIPTION

Problem to be Solved by the Present Disclosure

From the viewpoint of reducing manufacturing costs, it is required to dry an insulating varnish applied and baked on the outer peripheral surface of a conductor in a short time and at a low temperature and thereby cover the outer peripheral surface of the conductor, with an insulating layer. In this case, a polar solvent originating from the insulating varnish is likely to be left in the insulating layer and the insulation properties tend to be inhibited due to an increase in the permittivity of the insulating layer. On the other hand, a predetermined amount of a polar solvent needs to be contained in an insulating varnish from the viewpoint of storage stability of a resin, or the like. Accordingly, in an insulated wire in which an insulating layer is formed by drying an insulating varnish in a short time and at a low temperature, there is an earnest desire for development of an insulated wire in which the permittivity of the insulating layer can be reduced and therefore the insulation properties can be improved while the storage stability of the insulating varnish is maintained by allowing a predetermined amount of a polar solvent to be contained.

In view of the actual circumstances, an object of the present disclosure is to provide an insulated wire in which the permittivity of an insulating layer is reduced.

Advantageous Effect of the Present Disclosure

According to the present disclosure, an insulated wire in which the permittivity of an insulating layer is reduced can be provided.

Description of Embodiments

The present inventors have conducted diligent studies in order to solve the problem and completed the present disclosure. Specifically, the present inventors have noticed that by adding a low permittivity solvent together with a polar solvent (hereinafter, also referred to as "high permittivity solvent") to an insulating varnish for forming an insulating layer, the residual amount of the high permittivity solvent in the insulating layer is reduced. As a result, surprisingly, the present inventors have found that when an insulating layer is formed on the outer peripheral surface of a conductor using an insulating varnish in which a low permittivity solvent having a boiling point higher than that of a high permittivity solvent is added, the permittivity of the insulating layer can be reduced and therefore the insulation properties can be improved, and reached the present disclosure.

First of all, aspects of the present disclosure will be enumerated and described.

[1] An insulated wire according to one aspect of the present disclosure is an insulated wire including: a linear conductor: and an insulating layer that covers an outer peripheral surface of the conductor, wherein the insulating layer contains, as residual solvents, a first solvent having a relative permittivity of 15 or more and a second solvent having a relative permittivity of less than 15, a first ratio that is a ratio of a content of the second solvent to a total content of the first solvent and the second solvent contained in the insulating layer is 50% by mass or more, and a second ratio that is a ratio of the content of the second solvent to the total content of the first solvent and the second solvent contained in the insulating layer after a heating treatment of heating the insulated wire at 350° C. for 1 minute is higher than the first ratio. In the insulated wire having such characteristics, the permittivity of the insulating layer can be reduced, and therefore the insulation properties can be improved.

[2] The insulating layer preferably contains one or more resins selected from the group consisting of a polyimide resin, a polyamideimide resin, a polyesterimide resin, and a polyetherimide resin. Thereby, in the insulating layer containing a resin which is used for general purposes in insulated wires, the permittivity can be reduced.

[3] The insulating layer preferably contains 0.2% by mass or more and 10% by mass or less in total of the first solvent and the second solvent. Thereby, the permittivity of the insulating layer can be reduced further.

[4] The insulating layer preferably contains 5% by mass or less of the first solvent, and the insulating layer preferably contains 0.1% by mass or more and 5% by mass or less of the second solvent. Thereby, the permittivity of the insulating layer can be reduced further.

[5] The insulating layer preferably contains a curing agent, and the curing agent preferably contains one or more selected from the group consisting of an alicyclic acid anhydride, an aliphatic acid anhydride, an aromatic acid anhydride, imidazole, triethylamine, a titanium-based compound, an isocyanate-based compound, a blocked isocyanate, urea, melamine, a melamine compound, and an acetylene derivative. Thereby, formation of the insulating layer having the above-described characteristics from an insulating varnish can be accelerated.

Details of Embodiments of the Present Disclosure

Hereinafter, an embodiment of the present disclosure (hereinafter, also referred to as "present embodiment") will be described in more detail. As used herein, the description of a type of "A to B" means the upper limit and the lower limit of a range (that is, A or more and B or less), and in the case where a unit is not described in A and a unit is described only in B, the unit of A and the unit of B are the same. Further, as used herein, both of the terms "permittivity" and "relative permittivity" are used as an index representing the electric conductivity of a medium in the same context. As used herein, "high permittivity" means a relative permittivity of 15 or more, and "low permittivity" means a relative permittivity of less than 15. Furthermore, as used herein, "solvent" means a substance that is used for dissolving another substance. Therefore, the category of "solvent" as used herein includes materials which are solid as long as they are materials which are used for dissolving another substance, to say nothing of materials which are liquid at room temperature.

[Insulated Wire]

An insulated wire according to the present embodiment is an insulated wire including a linear conductor and an insulating layer that covers an outer peripheral surface of the conductor. The insulating layer contains, as residual solvents, a first solvent having a relative permittivity of 15 or more and a second solvent having a relative permittivity of less than 15. The first ratio that is a ratio of the content of the second solvent to the total content of the first solvent and the second solvent contained in the insulating layer is 50% by mass or more. Further, the second ratio that is a ratio of the content of the second solvent to the total content of the first solvent and the second solvent contained in the insulating layer after a heating treatment of heating the insulated wire at 350° C. for 1 minute is higher than the first ratio. In the insulated wire having such characteristics, the permittivity of the insulating layer can be reduced and therefore the insulation properties can be improved.

Although the details on the reason that the permittivity of the insulating layer can be reduced and therefore the insulation properties can be improved in the insulated wire are uncertain, but it is inferred that the reason is as follows.

That is, the insulated wire according to the present embodiment contains, as residual solvents, not only the first solvent having a relative permittivity of 15 or more but also the second solvent having a relative permittivity of less than 15 in the insulating layer. Further, the first ratio that is a ratio of the content of the second solvent to the total content of the first solvent and the second solvent contained in the insulating layer is 50% by mass or more. The first solvent has a relative permittivity of 15 or more and therefore is a high permittivity solvent, and the second solvent has a relative permittivity of less than 15 and therefore is a low permittivity solvent, and thus it is considered that the permittivity is controlled to be low in the insulating layer in which a half or more of the residual solvents is the second solvent.

Furthermore, when a heating treatment of heating the insulated wire at 350° C. for 1 minute is performed in the present embodiment, the ratio (second ratio) of the content of the second solvent to the total content of the first solvent and the second solvent contained in the insulating layer is higher than the first ratio. The second ratio being higher than the first ratio means that the first solvent volatilizes from the insulating layer more initiatively than the second solvent in the heating treatment. Here, the above-described heating treatment simulates a part of the drying step to be performed in a process of manufacturing the insulated wire, and therefore it is understood that the second solvent is left in the insulating layer in preference to the first solvent in the process of manufacturing the insulated wire. Thereby, it is understood that in the insulating varnish, the content of the second solvent is made small and the content of the first solvent is made sufficient, and thereby the storage stability of a resin can be maintained, and in the insulated wire, a half or more of the residual solvents contained in the insulating layer can be the second solvent and therefore the permittivity of the insulating layer can be reduced as described above. From those described above, it is inferred that in the insulated wire according to the present embodiment, the permittivity of the insulating layer can be reduced and therefore the insulation properties can be improved while the storage stability of the insulating varnish is maintained.

<Conductor>

The insulated wire according to the present embodiment includes a linear conductor, as described above. The conductor is an electric conductor. The material for the conductor is preferably a metal that has a high electric conductivity and has a high mechanical strength. Specific examples include copper, a copper alloy, aluminum, an aluminum alloy, nickel, silver, soft iron, steel, and stainless steel. The conductor may be an element wire obtained by forming these metals into a wire shape, may be a covered wire obtained by covering the surface of an element wire with another metal, or may be a twisted wire obtained by twisting a plurality of element wires. Examples of the covered wire include, but not limited to, a nickel-covered copper wire, a silver-covered copper wire, a silver-covered aluminum wire, and a copper-covered copper wire.

The shape of the conductor is not particularly limited, and a round wire, a flat wire, or the like can appropriately be selected according to the use application, electric properties, and the like of the insulated wire. That is, the cross-sectional shape of the conductor may be a circle or a flat in a cross section that appears by cutting the insulated wire along a surface perpendicular to the longitudinal direction of the insulated wire. The diameter, outer peripheral length, and the like of the conductor are not particularly limited, and can appropriately be selected according to the use application, electric properties, and the like of the insulated wire.

As used herein, the "flat" which is one of the cross-sectional shapes of the conductor includes a rectangle and a square, and shapes obtained by chamfering the four corners of these rectangle and square and shapes such that the four corners of these rectangle and square have round shapes (R-shapes), and the like.

The lower limit value of the cross-sectional area of the conductor is preferably 0.01 $mm^2$ and is more preferably 0.1 $mm^2$, and the upper limit value is preferably 20 $mm^2$ and is more preferably 10 $mm^2$. When the cross-sectional area of the conductor is less than 0.01 $mm^2$, the proportion of the volume of the insulating layer to that of the conductor is large, so that, for example, there is a risk that the volumetric efficiency of a coil formed using the insulated wire lowers.

When the cross-sectional area of the conductor is more than 20 $mm^2$, the insulating layer needs to be made thick in order to enhance the insulation of the insulated wire sufficiently, and as a result, the diameter of the insulated wire is made large, and therefore it tends to be difficult to wind the insulated wire around a core at a high density.

<Insulating Layer>

The insulated wire according to the present embodiment includes an insulating layer that covers the outer peripheral surface of the conductor, as described above. The insulating layer can contain any of the conventionally known resins which are adopted in order to form an insulating layer in an insulated wire of this type.

Specific examples of the resin which is contained in the insulating layer include thermosetting resins such as a polyvinylformal resin, a polyurethane resin, an alkyl resin, an epoxy resin, a phenoxy resin, a polyester resin, a polyesterimide resin, a polyester-amideimide resin, polyamideimide resin, and a polyimide resin, and thermoplastic resins such as a polyetherimide resin, a polyetheretherketone resin, a polyethersulfone resin, and a polyimide resin. One of these resins can be contained singly, or two or more of these resins can be mixed and contained.

The insulating layer in particular preferably contains one or more resins selected from the group consisting of a polyimide resin, a polyamideimide resin, a polyesterimide resin, and a polyetherimide resin. Thereby, the permittivity can be reduced in the insulating layer containing a resin which is used for general purposes in insulated wires. From the viewpoint of improving strength and heat resistance, the insulating layer more preferably contains a thermosetting polyimide resin.

Further, when the insulating layer contains a polyimide resin, the polyimide resin is also preferably a polyimide resin in which a small amount of a monomer other than polyimide is contained or in which a functional group has been introduced.

The lower limit value of the thickness of the insulating layer is preferably 5 μm, and the upper limit value is preferably 200 μm. When the thickness of the insulating layer is less than 5 μm, there is a tendency that breakage is likely to occur in the insulating layer, and therefore there is a risk that insulation of the conductor is insufficient. When the thickness of the insulating layer is more than 200 μm, there is a tendency that the volumetric efficiency of a coil or the like which is formed using the insulated wire lowers.

When the cross-sectional shape of the conductor is of a flat, the thickness of the insulating layer means an average value of the thickness of the insulating layer that covers two pairs of surfaces facing each other (upper surface, lower surface, left surface, and right surface) of the outer peripheral surfaces of the conductor in a cross section that appears by cutting the insulated wire along a surface perpendicular to the longitudinal direction of the insulated wire. Specifically, the surface to be an object of measurement is prepared by polishing the cross section that appears by cutting the insulated wire along a surface perpendicular to the longitudinal direction of the insulated wire. Subsequently, the surface to be an object of measurement is photographed using a digital microscope VHX-7000 (manufactured by KEYENCE CORPORATION) to obtain an image. Finally, as the thickness of the insulating layer that covers two pairs of surfaces facing each other of the outer peripheral surfaces of the conductor in the image, for example, one point is selected from each of the upper surface, the lower surface, the left surface, and the right surface, and the average value is calculated from the values determined by measuring the thickness of the insulating layer at the total of four points, and this average value can be adopted as the thickness of the insulating layer. The thickness of the insulating layer in the case where the cross-sectional shape of the conductor is a circle can be determined in such a way that in the ring-shaped insulating layer in the image of the surface to be an object of measurement, photographed with the digital microscope, four measurement points are selected at equal intervals, and subsequently, the thickness of the insulating layer is measured at the four measurement points to determine the average value of the thicknesses.

(Residual Solvents)

The insulating layer contains, as residual solvents, a first solvent having a relative permittivity of 15 or more and a second solvent having a relative permittivity of less than 15. As used herein, the "residual solvent" means a solvent component that is left in the insulating layer, among the solvent components contained in the insulating varnish which is applied on the outer periphery of the conductor in the process of manufacturing the insulated wire even after the insulating varnish is baked on the conductor and the insulating layer is thereby formed. The insulating varnish may be prepared by the above-described resin or a precursor of the resin diluted by an organic solvent containing at least the first solvent and the second solvent. The organic solvent can be composed of the above-described first solvent and second solvent.

1) First Solvent

The first solvent is a high permittivity solvent having a relative permittivity of 15 or more. As the first solvent, any of conventionally known organic solvents and materials solid at room temperature can be used as long as it is a high permittivity solvent having a relative permittivity of 15 or more. Specific examples of the first solvent include polar organic solvents such as N-methyl-2-pyrrolidone (NMP), N,N-dimethylacetamide (DMAc), N,N-dimethylformamide, dimethyl sulfoxide, tetramethylurea, hexaethylphosphoric triamide, and γ-butyrolactone, and ketone-based organic solvents such as acetone, methyl ethyl ketone, methyl isobutyl ketone, and cyclohexanone. As the first solvent, one of these organic solvents can be used singly, or two or more of these organic solvents can be mixed and used.

2) Second Solvent

The second solvent is a low permittivity solvent having a relative permittivity of less than 15. As the second solvent, any of conventionally known organic solvents and materials solid at room temperature which are low dielectric solvents having a relative permittivity of less than 15 and which satisfy the conditions which will be described later in the relationship with the first solvent can be used. Specific examples of the second solvent include ester-based organic solvents such as methyl acetate, ethyl acetate, butyl acetate, and diethyl oxalate, ether-based organic solvents such as diethyl ether, ethylene glycol dimethyl ether, diethylene glycol monomethyl ether, ethylene glycol monobutyl ether (butyl cellosolve), diethylene glycol dimethyl ether, and tetrahydrofuran, hydrocarbon-based organic solvents such as hexane, heptane, benzene, toluene, xylene, and naphtha, halogen-based organic solvents such as dichloromethane and chlorobenzene, phenol-based organic solvents such as cresol and chlorophenol, and amine-based organic solvents such as pyridine. Examples of the material which is solid at room temperature among the second solvents include paraffin wax. As the second solvent, one of these organic solvents and materials which are solid at room temperature can be used singly, or two or more of these organic solvents and materials which are solid at room temperature can be mixed and used.

As used herein, the "boiling point" of the second solvent in the case where the second solvent is naphtha or paraffin wax means a boiling point of a compound having the highest boiling point of the compounds contained in the second solvent (so-called "dry point").

Here, the low permittivity solvent which can be used as the second solvent satisfies the following two conditions in the relationship with the first solvent (high permittivity solvent). That is, the first condition is that the first ratio that is a ratio of the content of the second solvent to the total content of the first solvent and the second solvent contained in the insulating layer of the insulated wire is 50% by mass or more. Accordingly, the second solvent has, as a residual solvent contained in the insulating layer, a relationship such that the amount of the second solvent is equal to or more than the amount of the first solvent in terms of mass.

Further, the second condition is that the second ratio that is a ratio of the content of the second solvent to the total content of the first solvent and the second solvent contained in the insulating layer after the heating treatment of heating the insulated wire at 350° C. for 1 minute is higher than the first ratio. In this case, in the insulating layer of the insulated wire according to the present embodiment, the first solvent volatilizes more initiatively than the second solvent in the heating treatment, and therefore it is understood that the second solvent has a higher boiling point than the first solvent. That is, the second solvent has, as a residual solvent contained in the insulating layer, a relationship such that the boiling point is preferably higher than that of the first solvent. When the insulated wire according to the present embodiment satisfies the above-described first condition and second condition, thereby in the insulating varnish, the content of the second solvent is made small and the content of the first solvent is made sufficient, thereby a half or more of the residual solvents contained in the insulating layer of the insulated wire is the second solvent, and therefore the permittivity of the insulating layer can be controlled to be low while the storage stability of a resin is maintained.

With regard to the first ratio, the value thereof is preferably 70% by mass or more and is more preferably 80% by mass or more from the viewpoint of reducing the permittivity of the insulating layer still more. When that the second ratio can be 100% by mass is taken into consideration, the upper limit value of the first ratio is 99.99% by mass. The value of the second ratio is not particularly limited as long as it is higher than the first ratio. As for the value of the second ratio, the difference between the value of the second ratio and the value of the first ratio (second ratio−first ratio) is preferably 5 or more and is more preferably 10 or more from the viewpoint of reducing the permittivity of the insulating layer still more. Note that the upper limit value of the second ratio is also 1000% by mass as an ideal value.

3) Each Content, Total Content, and the Like of First Solvent and Second Solvent in Insulating Layer of Insulated Wire The insulating layer preferably contains 0.2% by mass or more and 10% by mass or less in total of the first solvent and the second solvent. Thereby, the permittivity of the insulating layer can be reduced further.

When the content of the first solvent and the second solvent is less than 0.2% by mass in total in the insulating layer, there is a possibility that the effect of reducing the permittivity due to containing the second solvent cannot be ascertained sufficiently. When the content of the first solvent and the second solvent in the insulating layer is more than 10% by mass in total, there is a possibility that an increase in the permittivity based on the first solvent and lowering of the strength of the insulating layer are concerned. The insulating layer more preferably contains 0.5% by mass or more and 5% by mass or less, and still more preferably contains 1% by mass or more and 4% by mass or less in total of the first solvent and the second solvent.

Further, the insulating layer preferably contains 5% by mass or less of the first solvent, and the insulating layer preferably contains 0.1% by mass or more and 5% by mass or less of the second solvent. Also in this case, the permittivity of the insulating layer can be reduced further.

When the content of the first solvent in the insulating layer is more than 5% by mass, there is a possibility that an increase in the permittivity based on the first solvent is concerned. Meanwhile, the lower limit value of the content of the first solvent in the insulating layer can be 0.02% by mass. When the content of the second solvent in the insulating layer before the heating treatment is less than 0.1% by mass, there is a possibility that the effect of reducing the permittivity based on the second solvent is insufficient. When the content of the second solvent in the insulating layer before the heating treatment is more than 5% by mass, there is a possibility that the strength of the insulating layer is impaired. The insulating layer before the heating treatment more preferably contains 3% by mass or less of the first solvent and still more preferably contains 1.5% by mass or less. The insulating layer more preferably contains 0.5% by mass or more and 4.5% by mass or less of the second solvent and still more preferably contains 1.5% by mass or more and 4% by mass or less.

(Measurement Method)

Each content of the first solvent and the second solvent in the insulating layer of the insulated wire can be determined by using, for example, a pyrolysis gas chromatography-mass spectrometer (Py-GC/MS, trade name: "6890N/5973 Network," manufactured by Agilent Technologies, Inc.). In this case, the atmosphere is a He gas, and the flow rate is 1 mL/min. Further, the pyrolysis temperature is set to 500° C.×1 min., which is a condition sufficient for the residual solvents to volatilize completely.

Details on the conditions for measuring each content of the first solvent and the second solvent in the insulating layer using the Py-GC/MS are described below. Pyrolysis apparatus: Double-Shot Pyrolyzer (trade name: "PY-2020iD," manufactured by Frontier Laboratories Ltd.) and MicroJet Cryo-Trap (trade name: MJT-1030E, manufactured by Frontier Laboratories Ltd.)

Column: UA-5 (inner diameter 0.25 mm×length 30 m, membrane thickness 0.25 μm, manufactured by Frontier Laboratories Ltd.)

Pyrolysis (temperature×time): 500° C.×1 min.

Inlet: 300° C., split ratio 100:1

Trap: −150° C.

Oven: 50° C.→(25° C./min.)→320° C. (5 min.)

Ionization method: Electron ionization (EI)

MS temperature: 230° C. (ion source), 150° C. (quadrupole)

Mass range: 33 to 550 a.m.u.

Further, each content (each residual amount) of the first solvent and the second solvent left in the insulating layer after the heating treatment of heating the insulated wire at 350° C. for 1 minute can be determined by using the above-described pyrolysis gas chromatography-mass spectrometer using a He gas (flow rate 1 mL/min) as an atmosphere in the same manner as in the above-described method for measuring each content of the first solvent and the second solvent in the insulating layer of the insulated wire. That is, each residual amount after the heating treatment can be determined by subtracting the amount of the solvent generated by measurement in which the pyrolysis temperature among the above-described measurement conditions is changed to 350° C.×1 min. from each content of the first solvent and the second solvent left in the insulating layer.

(Curing Agent)

The insulating layer preferably contains a curing agent. In this case, the curing agent preferably contains one or more selected from the group consisting of an alicyclic acid anhydride, an aliphatic acid anhydride, an aromatic acid anhydride, imidazole, triethylamine, a titanium-based compound, an isocyanate-based compound, a blocked isocyanate, urea, melamine, a melamine compound, and an acetylene derivative. Thereby, formation of the insulating layer having a reduced permittivity from the insulating varnish can be accelerated. These curing agents are appropriately selected according to the type of the resin or the precursor of the resin in the insulating varnish, but, for example, imidazole, melamine, a melamine compound, or the like is preferably used.

[Method for Manufacturing Insulated Wire]

The insulated wire according to the present embodiment can be obtained by applying a conventionally known manufacturing method relating to an insulated wire of this type except that a predetermined insulating varnish containing at least the first solvent and the second solvent is prepared. The insulated wire according to the present embodiment is preferably obtained using the following method for manufacturing an insulated wire from the viewpoint of, for example, manufacturing with a good yield.

That is, the method for manufacturing the insulated wire according to the present embodiment preferably includes preparing a conductor and an insulating varnish (first step) and covering the outer peripheral surface with an insulating layer (second step). Further, the covering (second step) preferably includes applying the insulating varnish on the outer peripheral surface (step A) and baking the insulating varnish on the conductor (step B). Hereinafter, each step included in the method for manufacturing the insulated wire according to the present embodiment will be described.

<First Step>

The first step is preparing a conductor and an insulating varnish. The conductor can be prepared by, for example, obtaining a commercially available product. In addition, the conductor can also be prepared by subjecting the above-described metal as the material for the conductor to casting, stretching, drawing into a wire form, and further softening.

The insulating varnish can be prepared by diluting the resin or the precursor of the resin, described above as a material for the insulating layer, with an organic solvent containing at least the above-described first solvent and second solvent. For example, as for the solid concentration of the resin in the insulating varnish, the lower limit value is preferably 15% by mass and is more preferably 20% by mass, and the upper limit value is preferably 50% by mass and is more preferably 30% by mass. When the precursor of the resin is contained in the insulating varnish, the above-described solid concentration of the resin means the concentration of the precursor of the resin. Further, the insulating varnish can contain a curing agent in addition to the first solvent, the second solvent, and the resin or the precursor of the resin, and may further contain a filler, various additives, and the like. The insulating varnish can further contain a solvent which is other than the above-described first solvent and second solvent.

Here, with regard to the first solvent and the second solvent contained in the insulating varnish, overlapping descriptions, such as conditions (such as relative permittivity, boiling point, and residual amount before and after heating treatment) of the solvent that needs to be used as the first solvent or the second solvent and specific solvent names, are not repeated. Further, an overlapping description such as the specific resin name of the resin or the precursor of the resin contained in the insulating varnish is not repeated, too. The ratio between the amounts of the first solvent and the second solvent contained in the insulating varnish, when expressed by a mass ratio, is preferably set to first solvent:second solvent=99.8:0.2 to 70:30. The content of the first solvent contained in the insulating varnish can be 55 to 97% by mass, and the content of the second solvent contained in the insulating varnish can be 0.1 to 30% by mass.

As the curing agent which can be contained in the insulating varnish, a substance having a function of curing a resin or a function of accelerating polymerization of a precursor of the resin can be used. Specific examples thereof include an alicyclic acid anhydride such as methyltetrahydrophthalic anhydride, an aliphatic acid anhydride, an aromatic acid anhydride, imidazole, triethylamine, a titanium-based compound, an isocyanate-based compound, a blocked isocyanate, urea, a melamine compound, and an acetylene derivative. These curing agents are appropriately selected according to the type of the resin or the precursor of the resin in the insulating varnish. For example, when a precursor of thermosetting polyimide is contained in the insulating varnish, imidazole or the like is preferably used as the curing agent.

Examples of the titanium-based compound include tetrapropyl titanate, tetraisopropyl titanate, tetramethyl titanate, tetrabutyl titanate, and tetrahexyl titanate. Examples of the isocyanate-based compound include aromatic diisocyanates such as tolylene diisocyanate (TDI), diphenylmethane diisocyanate (MDI), p-phenylene diisocyanate, and naphthalene diisocyanate; aliphatic diisocyanates having a carbon number of 3 to 12, such as hexamethylene diisocyanate (HDI), 2,2,4-trimethylhexane diisocyanate, and lysine diisocyanate; alicyclic isocyanates having a carbon number of 5 to 18, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate, 1,3-diisocyanatomethylcylclohexane (hydrogenated XDI), hydrogenated TDI, 2,5-bis(isocyanatomethyl)-bicyclo[2,2,1]heptane, and 2,6-bis(isocyanatomethyl)-bicyclo[2,2,1]heptane; aliphatic diisocyanates having an aromatic ring, such as xylylene diisocyanate (XDI), and tetramethyl xylylene diisocyanate (TMXDI); and modified products thereof.

Examples of the blocked isocyanate include diphenylmethane-4,4'-diisocyanate (MDI), diphenylmethane-3,3'-diisocyanate, diphenylmethane-3,4'-diisocyanate, diphenyl ether-4,4'-diisocyanate, benzophenone-4,4'-diisocyanate, diphenyl sulfone-4,4'-diisocyanate, tolylene-2,4-diisocyanate, tolylene-2,6-diisocyanate, naphthylene-1,5-diisocyanate, m-xylylene diisocyanate, and p-xylylene diisocyanate. Examples of the melamine compound include melamine, methylated melamine, butylated melamine, methylolated melamine, and butylolated melamine. Examples of the acetylene derivative include ethynyl aniline, and ethynyl phthalic anhydride.

<Second Step>

The second step is covering an outer peripheral surface of the conductor with an insulating layer. The second step can include applying an insulating varnish on the outer peripheral surface of the conductor (step A) and baking the insulating varnish on the conductor (step B).

(Step A)

Step A is applying the insulating varnish prepared through the first step on the outer peripheral surface of the conductor. Specifically, step A can be carried out by allowing the conductor on which the insulating varnish has been applied to pass through an opening of a die. In step A, the insulating varnish is preferably applied in a uniform thickness on the outer peripheral surface of the conductor by using a die having an opening.

(Step B)

Step B is baking the insulating varnish on the conductor. Specifically, step B can be carried out by disposing, in a baking furnace, the conductor on which the insulating varnish has been applied through step A and baking the insulating varnish on the conductor. Thereby, the solvents in the insulating varnish gasify and the resin solidifies, and therefore the insulating layer can be formed on the outer peripheral surface of the conductor.

The temperature and time for baking the insulating varnish in the baking furnace can appropriately be selected according to the types of the resin and the organic solvents in the insulating varnish among the temperature conditions and time conditions known when an insulated wire of this type is manufactured. Specifically, the quantity of heat that is sufficient for forming the insulating layer on the outer peripheral surface of the conductor and makes the amount of the residual solvents as desired may be first determined according to the type of the resin, and subsequently the baking temperature and time may be determined according to the quantity of heat. The quantity of heat can be allowed to correspond to a product of the baking temperature and time. When the baking temperature is a high temperature, the quantity of heat can correspond to the product by making the time short, and when the baking temperature is a low temperature, the quantity of heat can correspond to the product by making the time long.

Further, in the second step, the insulating layer is preferably made into a predetermined thickness by repeating the application of the insulating varnish and the baking of the insulating varnish and thereby laminating one or a plurality of the insulating layers. As the method for applying the insulating varnish and the method for baking the insulating varnish, conventionally known methods can be used. Thereafter, the insulating layer is dried by a conventionally known method, and thereby the insulated wire can be obtained.

As used herein, the insulating layer obtained by performing the application of the insulating varnish and the baking of the insulating varnish once refers to an insulating layer of "one layer," and the insulating layer obtained by performing the application of the insulating varnish and the baking of the insulating varnish a plurality of times refers to an insulating layer of "a plurality of layers."

<Action and Effect>

According to those described above, the insulated wire according to the present embodiment can be manufactured. In the insulated wire manufactured by the above-described manufacturing method, the permittivity of the insulating layer is reduced, and therefore the insulation properties can be improved.

[Supplementary Notes]

The above description includes embodiments described in supplementary notes below.

<Supplementary Note 1>

An insulated wire including: a linear conductor; and an insulating layer that covers an outer peripheral surface of the conductor, wherein

- the insulating layer contains, as residual solvents, a first solvent having a relative permittivity of 15 or more and a second solvent having a relative permittivity of less than 15,
- a first ratio that is a ratio of a content of the second solvent to a total content of the first solvent and the second solvent contained in the insulating layer is 50% by mass or more, and
- a boiling point of the second solvent is higher than a boiling point of the first solvent.

<Supplementary Note 2>

The insulated wire according to supplementary note 1, wherein the insulating layer contains one or more resins selected from the group consisting of a polyimide resin, a polyamideimide resin, a polyesterimide resin, and a polyetherimide resin.

<Supplementary Note 3>

The insulated wire according to supplementary note 1 or supplementary note 2, wherein the insulating layer contains 0.2% by mass or more and 10% by mass or less in total of the first solvent and the second solvent.

<Supplementary Note 4>

The insulated wire according to any one of supplementary note 1 to supplementary note 3, wherein

- the insulating layer contains 5% by mass or less of the first solvent, and
- the insulating layer contains 0.1% by mass or more and 5% by mass or less of the second solvent.

EXAMPLES

Hereinafter, the present disclosure will be described in more detail giving Examples, but the present disclosure is not limited to these. Insulated wires of a sample 2, a sample 4, a sample 6, a sample 8, a sample 10, and a sample 12, which will be described later, are Examples, and insulated wires of a sample 1, a sample 3, a sample 5, a sample 7, a sample 9, a sample 11, a sample 13, and a sample 14 are Comparative Examples.

[Measurement and Evaluation Methods]

First of all, items of evaluations performed in the present Examples and the methods of measuring the items will be described.

<Thickness of Insulating Layer>

For each of the insulated wires of Examples and Comparative Examples, the thickness (unit is μm) of the insulating layer was determined by using a digital microscope VHX-7000 (manufactured by KEYENCE CORPORATION) based on the above-described measurement method.

<Each Content of First Solvent and Second Solvent in Insulating Layer of Insulated Wire, and First Ratio>

For each of the insulated wires of Examples and Comparative Examples, each content (unit is ppm) of the first solvent and the second solvent in the insulating layer was determined by using a pyrolysis gas chromatography-mass spectrometer (Py-GC/MS, trade name: "6890N/5973 Network," manufactured by Agilent Technologies, Inc.) based on the above-described measurement method. The ratio (first ratio) of the content of the second solvent was also calculated from the total of the respective contents.

<Each Content of First Solvent and Second Solvent Left in Insulating Layer after Heating Treatment, and Second Ratio>

For each of the insulated wires of Examples and Comparative Examples, the heating treatment was performed and each content (each residual amount, unit is ppm) of the first solvent and the second solvent left in the insulating layer after the heating treatment was determined by using a pyrolysis gas chromatography-mass spectrometer (Py-GC/MS, trade name: "6890N/5973 Network," manufactured by Agilent Technologies, Inc.) based on the above-described measurement method. Further, the ratio (second ratio) of the content of the second solvent left in the insulating layer after the heating treatment was also calculated from the total of the respective contents. Here, as for the conditions of the heating treatment, a heating temperature of 350° C., a heating time of 1 minute, and a pressure of 1 atom, and a He atmosphere (flow rate: 1 mL/min.) were adopted as described above.

<Measurement of Permittivity>

For each of the insulated wires of Examples and Comparative Examples, the permittivity in the insulating layer was determined by using an impedance analyzer (trade name (model number): "ZA5405," manufactured by NF Corporation). Further, differences in the permittivity in the insulating layer among the samples were also calculated in each test, which will be described later.

[First Test]

<Preparation of Samples>

(Sample 1)

1) First Step

A commercially available linear conductor composed of a copper alloy and having a cross-sectional shape being a flat shape (cross-sectional area: 5 $mm^2$) was prepared. Further, a tetracarboxylic dianhydride and a diamine were dissolved at an equimolar ratio in the first solvent composed of N-methyl-2-pyrrolidone (NMP, relative permittivity: 32.2, boiling point: 204° C.), thereafter a condensation/polymerization reaction was accelerated, and thereby a polyamic acid (precursor of a polyamide) which is an insulating varnish was prepared. As the tetracarboxylic dianhydride, pyromellitic dianhydride was used. As the diamine, 4,4'-diamino diphenyl ether was used. The second solvent is not contained in the insulating varnish.

2) Second Step

The conductor prepared in the first step was immersed in the insulating varnish prepared in the first step, and thereby the insulating varnish was applied on the outer peripheral surface of the conductor. Subsequently, the above-described conductor including the insulating varnish applied thereon was allowed to pass through an opening of an application die, having a similar shape to the cross-sectional shape of the conductor (step A). Further, a baking treatment was carried out in a baking furnace on the conductor including the insulating varnish uniformly applied thereon through step A described above, and thereby the outer peripheral surface of the conductor was covered with an insulating layer (step B). In the baking treatment, a given quantity of heat (+++) sufficient for forming the insulating layer was calculated, and the baking temperature and time that enable imparting the quantity of heat (+++) were determined.

Next, the above-described application of the insulating varnish and baking of the insulating varnish on the insulating layer were repeated on the insulating layer formed in the second step, and thereby an insulated wire of sample 1 having an insulating layer of a plurality of layers was obtained.

(Sample 2)

An insulated wire of sample 2 was obtained in the same manner as sample 1 except that an insulating varnish was prepared by adding naphtha (relative permittivity: 1.8, boiling point: 247° C.) as the second solvent to the first solvent in the first step in such a way that the ratio between the amounts of the first solvent and the second solvent, when expressed by a mass ratio, satisfied first solvent:second solvent=9:1.

<Evaluation of Insulated Wires>

For each of the insulated wires of sample 1 and sample 2, the material name and thickness of the insulating layer, the permittivity of the insulating layer, the ratio (first ratio) of the content of the second solvent based on the total of the content of the first solvent and the content of the second solvent in the insulating layer of the insulated wire, the residual amount of the first solvent and the residual amount of the second solvent left in the insulating layer after the heating treatment, and the ratio (second ratio) of the residual amount of the second solvent based on the respective residual amounts were determined respectively. Table 1 shows the results. Table 1 also shows the permittivity and boiling point of NMP used as the first solvent and the permittivity and boiling point of naphtha used as the second solvent.

[Second Test]

<Preparation of Samples>

(Sample 3)

An insulated wire of sample 3 was obtained in the same manner as sample 1 except that the quantity of heat used for carrying out the baking treatment was set to a quantity of heat (++) two thirds of that for sample 1 in step B in the second step.

(Sample 4)

An insulated wire of sample 4 was obtained in the same manner as sample 3 except that an insulating varnish was prepared by adding naphtha (relative permittivity: 1.8, boiling point: 247° C.) as the second solvent to the first solvent in the first step in such a way that the ratio between the amounts of the first solvent and the second solvent, when expressed by a mass ratio, satisfied first solvent:second solvent=9:1.

<Evaluation of Insulated Wires>

For each of the insulated wires of sample 3 and sample 4, measurement was performed on each of the same evaluation items as in the above-described first test. Table 1 shows the results.

[Third Test]

<Preparation of Samples>

(Sample 5)

An insulated wire of sample 5 was obtained in the same manner as sample 1 except that the quantity of heat used for carrying out the baking treatment was set to a quantity of heat (+) one third of that for sample 1 in step B in the second step.

(Sample 6)

An insulated wire of sample 6 was obtained in the same manner as sample 5 except that an insulating varnish was prepared by adding naphtha (relative permittivity: 1.8, boiling point: 247° C.) as the second solvent to the first solvent in the first step in such a way that the ratio between the amounts of the first solvent and the second solvent, when expressed by a mass ratio, satisfied first solvent:second solvent=9:1.

<Evaluation of Insulated Wires>

For each of the insulated wires of sample 5 and sample 6, measurement was performed on each of the same evaluation items as in the above-described first test. Table 1 shows the results.

[Fourth Test]

<Preparation of Samples>

(Sample 7)

An insulated wire of sample 7 was obtained in the same manner as sample 5 except that an insulating varnish was prepared using the first solvent composed of N,N-dimethylacetoamide (DMAc, relative permittivity: 37.8, boiling point: 165° C.) in place of NMP in the first step. The second solvent is not contained in the insulating varnish.

(Sample 8)

An insulated wire of sample 8 was obtained in the same manner as sample 7 except that an insulating varnish was prepared by adding naphtha (relative permittivity: 1.8, boiling point: 247° C.) as the second solvent to the first solvent in the first step in such a way that the ratio between the amounts of the first solvent and the second solvent, when expressed by a mass ratio, satisfied first solvent:second solvent=91.

<Evaluation of Insulated Wires>

For each of the insulated wires of sample 7 and sample 8, measurement was performed on each of the same evaluation items as in the above-described first test. Table 2 shows the results. Table 2 also shows the permittivity and boiling point of DMAc and NMP used as the first solvent and the permittivity and boiling point of naphtha used as the second solvent.

[Fifth Test]

<Preparation of Samples>

(Sample 9)

An insulated wire of sample 9 was obtained by preparing the same insulated wire as sample 5

(Sample 10)

An insulated wire of sample 10 was obtained in the same manner as sample 9 except that an insulating varnish was prepared by adding naphtha (relative permittivity: 1.8, boiling point: 247° C.) as the second solvent to the first solvent in such a way that the ratio between the amounts of the first solvent and the second solvent, when expressed by a mass ratio, satisfied first solvent:second solvent=8.5:1.5.

<Evaluation of Insulated Wires>

For each of the insulated wires of sample 9 and sample 10, measurement was performed on each of the same evaluation items as in the above-described first test. Table 2 shows the results.

[Sixth Test]

<Preparation of Samples>

(Sample 11)

An insulated wire of sample 11 was obtained in the same manner as sample 3 except that an insulating varnish was prepared by using pyromellitic dianhydride as the tetracarboxylic dianhydride and 3,3',4,4'-biphenyl tetracarboxylic dianhydride, which are raw materials for a polyamide acid, in a molar ratio of 3:7 in the first step. The second solvent is not contained in the insulating varnish.

(Sample 12)

An insulated wire of sample 12 was obtained in the same manner as sample 11 except that an insulating varnish was prepared by adding naphtha (relative permittivity: 1.8, boiling point: 247° C.) as the second solvent to the first solvent in the first step in such a way that the ratio between the amounts of the first solvent and the second solvent, when expressed by a mass ratio, satisfied first solvent:second solvent=9:1

<Evaluation of Insulated Wires>

For each of the insulated wires of sample 11 and sample 12, measurement was performed on each of the same evaluation items as in the above-described first test. Table 2 shows the results.

[Seventh Test]

<Preparation of Samples>

(Sample 13)

An insulated wire of sample 13 was obtained by preparing the same insulated wire as sample 5.

(Sample 14)

An insulated wire of sample 14 was obtained in the same manner as sample 13 except that an insulating varnish was prepared by adding naphtha (relative permittivity: 1.8, boiling point: 175° C.) as the second solvent to the first solvent in the first step in such a way that the ratio between the amounts of the first solvent and the second solvent, when expressed by a mass ratio, satisfied first solvent:second solvent=8:2.

<Evaluation of Insulated Wires>

For each of the insulated wires of sample 13 and sample 14, measurement was performed on each of the same evaluation items as in the above-described first test. Table 2 shows the results.

TABLE 1

| | | First test | | Second test | | Third test | |
|---|---|---|---|---|---|---|---|
| | Sample No. | 1 | 2 | 3 | 4 | 5 | 6 |
| | Quantity of heat | +++ | +++ | ++ | ++ | + | + |
| | Insulating layer | PI | PI | PI | PI | PI | PI |
| | Thickness of insulating layer (μm) | 31.5 | 31.5 | 32.1 | 32.1 | 31.9 | 31.9 |
| First solvent | Solvent name | NMP | NMP | NMP | NMP | NMP | NMP |
| | Relative permittivity | 32.2 | 32.2 | 32.2 | 32.2 | 32.2 | 32.2 |
| | Boiling point (° C.) | 204 | 204 | 204 | 204 | 204 | 204 |
| | Residual amount (ppm) | 3216 | 1025 | 4860 | 2432 | 12540 | 8577 |
| Second solvent | Solvent name | — | Naphtha | — | Naphtha | — | Naphtha |
| | Relative permittivity | — | 1.8 | — | 1.8 | — | 1.8 |
| | Boiling point (° C.) | — | 247 | — | 247 | — | 247 |
| | Residual amount (ppm) | — | 3261 | — | 6664 | — | 24497 |
| | Total residual amount of solvents (ppm) | 3216 | 4286 | 4860 | 9096 | 12540 | 33074 |
| | Amount of second solvent (ppm) | — | 3261 | — | 6664 | — | 24997 |
| | First ratio (mass %) | — | 76 | — | 73 | — | 74 |
| | Second ratio (mass %) (350° C. × 1 min.) | — | 86 | — | 84 | — | 84 |
| | Whole permittivity | 3.1 | 3.0 | 3.2 | 3.1 | 3.5 | 3.3 |
| | Reduction of permittivity | — | ▲0.1 | — | ▲0.1 | — | ▲0.2 |

TABLE 2

| | | Fourth test | | Fifth test | | Sixth test | | Seventh test | |
|---|---|---|---|---|---|---|---|---|---|
| | Sample No. | 7 | 8 | 9 | 10 | 11 | 12 | 13 | 14 |
| | Quantity of heat | + | + | + | + | ++ | ++ | + | + |
| | Insulating layer | PI | PI | PI | PI | PI | PI | PI | PI |
| | Thickness of insulating layer (μm) | 31.0 | 31.0 | 31.7 | 31.7 | 31.8 | 31.8 | 32.2 | 32.2 |
| First solvent | Solvent name | DMAc | DMAc | NMP | NMP | NMP | NMP | NMP | NMP |
| | Relative permittivity | 37.8 | 37.8 | 32.2 | 32.2 | 32.2 | 32.2 | 32.2 | 32.2 |
| | Boiling point (° C.) | 165 | 165 | 204 | 204 | 204 | 204 | 204 | 204 |
| | Residual amount (ppm) | 8650 | 5022 | 12540 | 5752 | 3564 | 1246 | 12540 | 10164 |
| Second solvent | Solvent name | — | Naphtha | — | Naphtha | — | Naphtha | — | Naphtha |
| | Relative permittivity | — | 1.8 | — | 1.8 | — | 1.8 | — | 1.8 |
| | Boiling point (° C.) | — | 247 | — | 247 | — | 247 | — | 175 |
| | Residual amount (ppm) | — | 23570 | — | 32455 | — | 3856 | — | 1986 |
| | Total residual amount of solvents (ppm) | 8650 | 28592 | 12540 | 38207 | 3564 | 5102 | 12540 | 12150 |
| | Amount of second solvent (ppm) | — | 23570 | — | 32455 | — | 3856 | — | 1986 |
| | First ratio (mass %) | — | 82 | — | 85 | — | 76 | — | 16 |
| | Second ratio (mass %) (350° C. × 1 min.) | — | 93 | — | 91 | — | 85 | — | 11 |
| | Whole permittivity | 3.4 | 3.1 | 3.5 | 3.2 | 3.1 | 3.0 | 3.5 | 3.5 |
| | Reduction of permittivity | — | ▲0.3 | — | ▲0.3 | — | ▲0.1 | — | 0 |

CONSIDERATION

According to Table 1, when the insulating layer contains the first solvent and the second solvent as residual solvents; the first ratio that is a ratio of the content of the second solvent to the total content of the first solvent and the second solvent contained in the insulating layer is 50% by mass or more; and the second ratio that is a ratio of the residual amount of the second solvent to the total residual amount of the first solvent and the second solvent left in the insulating layer after the heating treatment of heating the insulated wire at 350° C. for 1 minute is higher than the first ratio, the effect of reducing the permittivity was ascertained. That is, in the first test, the permittivity in the insulating layer was reduced more in sample 2 than in sample 1, in the second test, the permittivity in the insulating layer was reduced more in sample 4 than in sample 3, and in the third test, the permittivity in the insulating layer was reduced more in sample 6 than in sample 5. Similarly, in the fourth test, the permittivity in the insulating layer was reduced more in sample 8 than in sample 7, in the fifth test, the permittivity in the insulating layer was reduced more in sample 10 than in sample 9, and in the sixth test, the permittivity in the insulating layer was reduced more in sample 12 than in sample 11.

In contrast, with regard to sample 14 in the seventh test, the boiling point of naphtha as the second solvent is 175° C. and is lower than the boiling point (204° C.) of NMP as the first solvent, and therefore a larger amount of naphtha (second solvent) volatilized than NMP (first solvent) in the second step. Thereby, in the insulated wire of sample 14, the first ratio is less than 50% by mass, and the second ratio is lower than the first ratio, and therefore the permittivity was not reduced less than in sample 13. From those described above, in the insulated wires of sample 2, sample 4, sample 6, sample 8, sample 10, and sample 12, the permittivity of the insulating layer was reduced, and therefore it is understood that the insulating properties can be improved.

The embodiments and Examples of the present disclosure have been described above, but it is also planned from the beginning to appropriately combine the above-described embodiments and compositions of Examples.

The embodiments and Examples disclosed herein are to be considered in all respects as illustrative and not restrictive. The scope of the present invention is defined by the claims rather than the above-described embodiments and Examples, and is intended to include meaning equivalent to the claims and all modifications within the scope equivalent to the claims.

The invention claimed is:

1. An insulated wire comprising: a linear conductor; and an insulating layer that covers an outer peripheral surface of the conductor, wherein the insulating layer comprises, as residual solvents, a first solvent having a relative permittivity of 15 or more and a second solvent having a relative permittivity of less than 15, a first ratio that is a ratio of a content of the second solvent to a total content of the first solvent and the second solvent contained in the insulating layer is 50% by mass or more, a second ratio that is a ratio of the content of the second solvent to the total content of the first solvent and the second solvent contained in the insulating layer after a heating treatment of heating the insulated wire at 350° C. for 1 minute is higher than the first ratio, the insulating layer comprises 5% by mass or less of the first solvent, and the insulating layer comprises 0.1% by mass or more and 5% by mass or less of the second solvent.

2. The insulated wire according to claim 1, wherein the insulating layer comprises one or more resins selected from the group consisting of a polyimide resin, a polyamideimide resin, a polyesterimide resin, and a polyetherimide resin.

3. The insulated wire according to claim 1, wherein the insulating layer comprises 0.2% by mass or more and 10% by mass or less in total of the first solvent and the second solvent.

4. The insulated wire according to claim 1, wherein the insulating layer comprises a curing agent, and the curing agent comprises one or more selected from the group consisting of an alicyclic acid anhydride, an aliphatic acid anhydride, an aromatic acid anhydride, imidazole, triethylamine, a titanium-based compound, an isocyanate-based compound, a blocked isocyanate, urea, melamine, a melamine compound, and an acetylene derivative.

* * * * *